(12) United States Patent
Miyasato et al.

(10) Patent No.: US 9,909,639 B2
(45) Date of Patent: Mar. 6, 2018

(54) LOW-DUST/DUST-RESISTANT SHOCK ABSORBER

(71) Applicant: SMC CORPORATION, Chiyoda-ku (JP)

(72) Inventors: Eiko Miyasato, Moriya (JP); Tsuyoshi Mita, Moriya (JP); Kodai Yoshinaga, Moriya (JP); Youji Takakuwa, Kitakatsushika-gun (JP); Junya Kaneko, Abiko (JP)

(73) Assignee: SMC CORPORATION, Chiyoda-ku (JP)

( * ) Notice: Subject to any disclaimer, the term of this patent is extended or adjusted under 35 U.S.C. 154(b) by 1 day.

(21) Appl. No.: 14/901,280

(22) PCT Filed: Mar. 20, 2014

(86) PCT No.: PCT/JP2014/057681
§ 371 (c)(1),
(2) Date: Dec. 28, 2015

(87) PCT Pub. No.: WO2014/208151
PCT Pub. Date: Dec. 31, 2014

(65) Prior Publication Data
US 2016/0369863 A1    Dec. 22, 2016

(30) Foreign Application Priority Data

Jun. 28, 2013  (JP) .................................. 2013-137317

(51) Int. Cl.
*F16F 13/00*  (2006.01)
*F16F 9/36*  (2006.01)
(Continued)

(52) U.S. Cl.
CPC .............. *F16F 13/007* (2013.01); *F16F 9/19* (2013.01); *F16F 9/3221* (2013.01);
(Continued)

(58) Field of Classification Search
CPC .... F16F 9/18; F16F 9/19; F16F 9/3221; F16F 9/3242; F16F 9/3278; F16F 9/3285;
(Continued)

(56) References Cited

U.S. PATENT DOCUMENTS 4,045,008 A  * 8/1977 Bauer .................... F16F 9/36
                                                    267/120
4,493,490 A  * 1/1985 Ohma ................... B62K 25/08
                                                    188/322.17
(Continued)

FOREIGN PATENT DOCUMENTS

CN   2076937 U   5/1991
CN   2360677 Y   1/2000
(Continued)

OTHER PUBLICATIONS

International Search Report dated Jun. 24, 2014 in PCT/JP14/057681 dated Mar. 20, 2014.
(Continued)

*Primary Examiner* — Thomas J Williams
(74) *Attorney, Agent, or Firm* — Oblon, McClelland, Maier & Neustadt, L.L.P.

(57) ABSTRACT

A shock absorber includes a cylinder housing including a piston chamber in which oily liquid is disposed, a piston movable in the piston chamber, a rod connected to the piston and protruding out from the cylinder housing, and a return mechanism for the rod. In the shock absorber, a cylindrical bearing made of a synthetic resin having a shock-absorbing property, a dust collecting member for avoiding entry of dust particles, and a lubricating member for supplying a lubricating oil to a surface of the rod are disposed in a rod guiding hole in the cylinder housing. A leading end of the bearing protrudes outside with respect to an outer end surface of the cylinder housing and acts as a contact portion that allows a moving object to come into contact therewith, and thus the
(Continued)

bearing functions to guide the rod and also functions as a stopper for avoiding the moving object from coming into contact with the outer end surface of the cylinder housing.

10 Claims, 3 Drawing Sheets

(51) Int. Cl.
*F16F 9/19* (2006.01)
*F16F 9/32* (2006.01)
*F16F 9/38* (2006.01)

(52) U.S. Cl.
CPC .............. *F16F 9/3278* (2013.01); *F16F 9/36* (2013.01); *F16F 9/38* (2013.01); *F16F 2230/30* (2013.01)

(58) Field of Classification Search
CPC ... F16F 9/36; F16F 9/362; F16F 9/363; F15B 15/1433; F15B 15/1438; F15B 15/1442; F15B 15/1461
USPC .......................... 188/322.17; 92/165 R, 168
See application file for complete search history.

(56) References Cited

U.S. PATENT DOCUMENTS

| | | | | |
|---|---|---|---|---|
| 4,736,824 A * | 4/1988 | Dony | ................... | F16F 9/0245 188/322.17 |
| 4,856,625 A * | 8/1989 | Oshida | ................. | F16F 9/0218 16/66 |
| 4,946,143 A * | 8/1990 | Bauer | ....................... | F16F 9/36 188/322.17 |
| 5,127,497 A * | 7/1992 | Struckmeyer | .......... | F16J 15/328 188/322.17 |
| 5,275,387 A * | 1/1994 | Cotter | ................... | F16F 9/0227 188/322.17 |
| 6,315,093 B1 * | 11/2001 | Miura | ..................... | F16F 9/061 188/268 |
| 7,810,619 B2 * | 10/2010 | Maeda | ..................... | F16F 9/58 188/322.17 |
| 2002/0014381 A1 | 2/2002 | Komatsu et al. | | |
| 2013/0015027 A1 * | 1/2013 | Miyasato | ................ | F16F 9/363 188/269 |

FOREIGN PATENT DOCUMENTS

| | | | | |
|---|---|---|---|---|
| CN | 2385144 Y | 6/2000 | | |
| JP | 2002-21909 A | 1/2002 | | |
| JP | 2004 11786 | 1/2004 | | |
| JP | 2009 74596 | 4/2009 | | |
| JP | 2010 7765 | 1/2010 | | |
| JP | 2010 127444 | 6/2010 | | |
| WO | WO 2011086780 A1 * | 7/2011 | .............. | F16F 9/363 |

OTHER PUBLICATIONS

Combined Chinese Office Action and Search Report dated Oct. 25, 2016 in Patent Application No. 201480036872.1 (with English language translation).

* cited by examiner

LOW-DUST/DUST-RESISTANT SHOCK ABSORBER

TECHNICAL FIELD

The present invention relates to a shock absorber that damps shock in stopping a moving object by using flow resistance of viscous fluid in a shock-absorbing manner. In particular, the present invention relates to a low-dust/dust-resistant shock absorber capable of suppressing dust generation from shocks, slides, or the like when the moving object is stopped and also capable of suppressing leakage of an oil film or entry of dust particles over a rod surface and increasing durability.

BACKGROUND ART

Traditionally, shock absorbers that damp shock in stopping a moving object by using fluid resistance of viscous fluid are fairly common, as disclosed in, for example, Patent Literatures 1 and 2.

A shock absorber of this type typically has a configuration in which oily liquid, such as mineral oil, is charged in a piston chamber, the piston for braking is housed in a state where a flow gap for the oily liquid is maintained, and a rod connected to the piston is extended to the outside of the cylinder housing. When the moving object collides with a leading end of the rod and pushes the piston, the oily liquid charged in the piston chamber moves in a direction opposite the sliding direction of the piston, kinetic energy of the moving object is absorbed by means of the flow resistance of the oily liquid flowing through the flow gap during that movement.

Typically, the above-described shock absorber has a configuration in which, when the moving object collides with the leading end of the rod protruding from the rod cover in a leading end portion of the cylinder housing and the rod retracts, the rod moves until the moving object comes into contact with the leading end surface of the rod cover and its stopping position is determined.

The rod cover is typically made of a metal, such as stainless steel. Every time the piston retracts due to collision with the moving object and the moving object collides with the rod cover, minute metal dust particles are typically produced by friction or the like caused by movement of displacement between the moving object and the rod cover, and before that, in addition, dust particles are also generated when the moving object collides with the leading end of the rod in most cases. Moreover, wear particles are also generated between the rod and a rod gasket or bearing member slidably supporting the rod in the cylinder housing. If metal powder adheres to a device under facility environment that deal with semiconductor devices or the like, the characteristics of the device may be affected. Accordingly, it is inappropriate to use the traditional shock absorber as it is in environments that dislike metal dust particles, such as the environments in the semiconductor manufacture field.

Examples of measures to address the above-described problems are described below. One example measure is that the shock absorber uses a configuration that reduces generation of dust particles when the moving object collides with the rod or rod cover as much as possible and that generates no wear particles between the rod and the rod gasket or bearing member in the cylinder housing. Another example measure is that the above-described dust-generating portion is covered to suppress flying dust particles, the dust particles in the dust-generating portion are sucked by force, and additionally, the moving object and the dust-generating portion where dust is generated from collision with the moving object in the shock absorber are moved to a location where the influence of the dust generation on the entire equipment is low. The former measure is expected to be achieved at reduced cost. With the latter measure, the equipment may lead to increased cost. Thus, the former measure is needed to reduce the generation of dust particles.

Furthermore, in the above-described shock absorber, if dust particles or the like generated in the above-described way are on the rod when the moving object collides with the rod protruding out from the cylinder housing, they enter the cylinder housing and cause wearing out of the internal structure or the like. Thus, it is necessary to arrange a dust-resistant wiper or the like around the rod to suppress the entry of foreign substances. Because the rod is supported on the bearing in the cylinder housing with an oil film for lubrication disposed therebetween, there is also a necessity to prevent the oil film for lubrication from leaking out over the bearing, in addition to the necessity of suppressing the entry of foreign substances into the cylinder housing. If the leakage of the oil film for lubrication proceeds, even the oily liquid charged in the cylinder housing and absorbing kinetic energy of the moving object by its flow resistance leaks out, and the performance as the shock absorber is finally lost.

CITATION LIST

Patent Literature

PTL 1: Japanese Unexamined Patent Application Publication No. 2004-11786
PTL 2: Japanese Unexamined Patent Application Publication No. 2010-7765

SUMMARY OF INVENTION

Technical Problem

Basically, it is an object of the present invention to provide a low-dust/dust-resistant shock absorber capable of avoiding collision of a moving object with a cylinder housing, avoiding generation of dust particles, in addition, avoiding the rod from bringing foreign substances, such as dust particles, into the cylinder housing by a rod, and suppressing leakage of an oil film for lubrication to the outside over a bearing.

Solution to Problem

To achieve the above object, the present invention provides a low-dust/dust-resistant shock absorber including a metal cylinder housing including a piston chamber in which oily liquid is sealed, a piston movable in an axial direction in the piston chamber in a state where a gap for providing the oily liquid with flow resistance is maintained, a rod including a base end portion connected to the piston and a leading end portion protruding out through a rod guiding hole in the cylinder housing in a fluid-tight manner, the rod allowing a moving object to be subjected to braking to collide with the leading end portion, and a return mechanism that urges the rod in a direction in which the rod protrudes from the cylinder housing. A cylindrical bearing made of a synthetic resin having a shock-absorbing property is mounted on an end portion of the rod guiding hole in the cylinder housing, the rod extends through a center hole of the bearing so as to be able to freely slide, a leading end of the bearing protrudes outside with respect to an outer end surface of the cylinder housing and acts as a contact portion that allows the moving object to come into contact therewith, and thus the bearing also functions as a stopper for avoiding the moving object from coming into contact with the outer end surface of the cylinder housing. A dust collecting member for avoiding entry of dust particles and a lubricating member for retaining a lubricating oil and supplying the lubricating oil to a surface of the rod are disposed in a location in the rod guiding hole on a side of the piston chamber with respect to the bearing.

In the low-dust/dust-resistant shock absorber having the above-described configuration, the cylindrical bearing made of the synthetic resin having the shock-absorbing property supports the rod such that it is freely slidable and also functions as the stopper for stopping the moving object without permitting the moving object to come into contact with the cylinder housing after the moving object collides with the leading end of the rod. In addition, when the moving object collides with the bearing, which is made of the above-described synthetic resin having the shock-absorbing property, no dust particles are generated, and the moving object can be stopped at a predetermined stop position in a shock-absorbing manner.

Because the lubricant, such as grease, sucked in the lubricating member is continually supplied to the surface of the rod and an oil film is formed, the rod can smoothly slide, the dust particles adhering to the rod can be captured and can be avoided from entering the inside. Moreover, the oil film that adheres to the rod and may leak to the outside can be gathered and retained, and contamination of an outside environment caused by leakage of the oil film can be avoided. At the same time, wastage of the oil film can be reduced.

If the lubricant, such as grease, sucked in the lubricating member is continually supplied to the surface of the rod, the remaining is reduced, and the supply of the lubricant is virtually impossible, the oily liquid charged in the piston chamber is used in forming the oil film as an alternative to the lubricant. In this case, substantially the same function as that when the lubricant is used is ensured.

In the present invention, the bearing may preferably have an axial length equivalent or larger than a diameter of the rod.

In the present invention, preferably, the cylinder housing may include a housing body including the piston chamber and a rod cover connected to an end portion of the housing body, and the dust collecting member and the lubricating member may be disposed on the rod cover.

Each of the dust collecting member and the lubricating member may preferably be made of a porous material, and the dust collecting member may preferably be held in a dry state.

In the present invention, a rod gasket is arranged in a location of an end in the rod guiding hole on the side of the piston chamber, the rod gasket is in slidable contact with an outer circumferential surface of the rod, and a relationship between the location of the rod gasket and a stroke of the rod is set such that a portion in the rod that comes into contact with the rod gasket when the rod is fully depressed into the bearing is not exposed to an outside from the bearing when the rod protrudes.

This configuration is effective in suppressing entry of the dust particles adhering to the rod into the cylinder housing and is also effective in suppressing adhesion of the oil film to the rod and leakage of the oil film to the outside.

In the present invention, the rod may have a groove for reducing an area of the rod that comes into contact with the bearing, and the groove may be disposed in an outer surface of the rod.

The groove may preferably be in a location at which, when the rod is in an initial position, the groove may preferably be exposed from the bearing and, when the rod is depressed into the bearing by the moving object, the groove may preferably come into contact with an inner circumferential surface of the bearing. The groove may preferably have a depth gradually deeper toward a base end of the rod.

The groove may be a circular or spiral shape. A dust-particle capturing member for capturing dust particles adhering to an inner circumferential surface of the bearing may be disposed inside the groove.

Advantageous Effects of Invention

The above-described shock absorber in the present invention can avoid collision of the moving object with the cylinder housing, avoid generation of dust particles, in addition, avoid the rod from bringing foreign substances, such as dust particles, into the cylinder housing by a rod, and suppress leakage of the oil film for lubrication over the bearing to the outside. Accordingly, the shock absorber can be used under environments that dislike dust particles and also can maintain an extended life even under environments with a larger amount of dust particles because it has a configuration that can suppress entry of foreign substances, such as dust particles.

DESCRIPTION OF EMBODIMENTS

Figure 1:
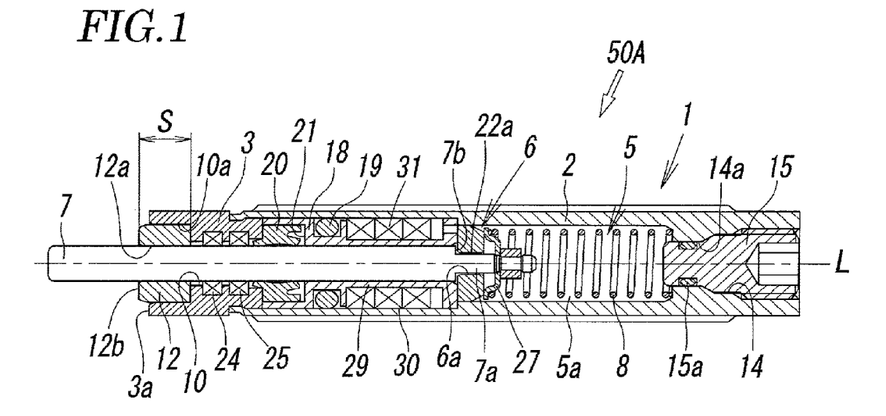
FIG. 1 is a cross-sectional view that illustrates a state where a piston and rod are in an initial position in a low-dust/dust-resistant shock absorber according to a first embodiment of the present invention.
Figure 2:
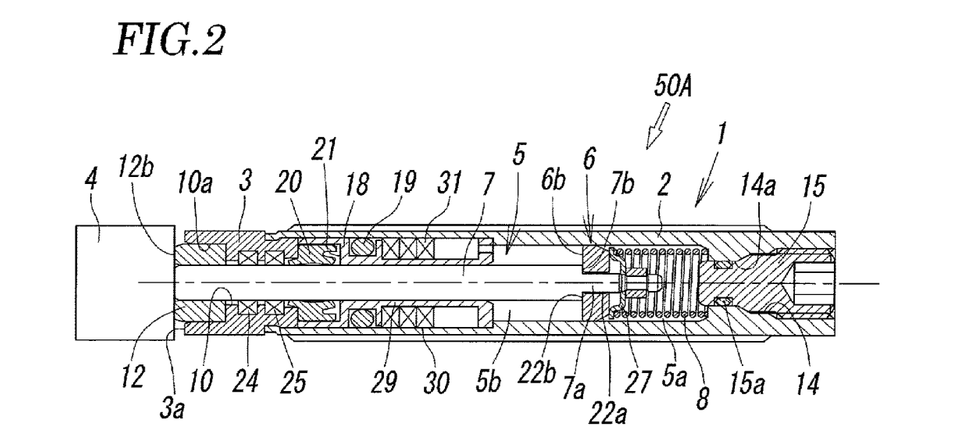
FIG. 2 is a cross-sectional view that illustrates an operating state where the piston and rod in the shock absorber are moved to a damping position.

FIGS. 1 and 2 illustrate a low-dust/dust-resistant shock absorber according to a first embodiment of the present invention. A shock absorber 50A includes, as main members, a cylinder housing 1 including a piston chamber 5 in which oily liquid is disposed, a piston 6 housed in the piston chamber 5 such that it can move along a direction of an axis L in a state where a gap for providing the oily liquid with flow resistance is maintained, a rod 7 having a base end connected to the piston 6 and a leading end extended out through a rod guiding hole 10 in the cylinder housing 1 in a fluid-tight manner, and a return spring 8 as a return mechanism for urging the rod 7 in a direction in which it protrudes from the cylinder housing 1. The shock absorber 50A stops a moving object 4 colliding with the leading end of the rod 7 in a shock-absorbing manner by using flow resistance of the oily liquid when the piston 6 moves in the piston chamber 5.

The cylinder housing 1 may preferably be configured by connecting a metal housing body 2 including the piston chamber 5 and a metal rod cover 3 allowing the rod 7 to be extended out in a fluid-tight manner, as illustrated in the drawings. However, the cylinder housing 1 is not limited to that configuration.

The rod guiding hole 10 in the rod cover 3 in the cylinder housing 1 has a bearing housing hole 10a whose hole diameter is enlarged at a location of its outer end. A cylindrical bearing 12 made of a synthetic resin having the shock-absorbing property is attached in a state where it has been tightly inserted in the bearing housing hole 10a. The rod 7 extends through a center hole 12a in the bearing 12 so as to be able to freely slide. The opposite end surfaces of the bearing 12 in the direction of the axis L are flat surfaces perpendicular to the axis L, a leading end surface of the opposite end surfaces is a contact portion 12b protruding outward with respect to an outer end surface 3a of the rod cover 3 and allowing the moving object 4 to come into contact therewith. The protrusion of the bearing 12 from the cylinder housing 1 has a length at which even when the moving object 4 collides with the leading end of the rod 7, the rod 7 is depressed into the cylinder housing 1, the moving object 4 comes into contact with the contact portion 12b, and the bearing 12 is compressed and deformed, collision of the moving object 4 with the outer end surface of the cylinder housing 1, that is, outer end surface 3a of the rod cover 3.

With this configuration, the bearing 12, which is made of a synthetic resin having the shock-absorbing property, supports and guides the rod 7 so as to be able to freely slide. The bearing 12 also functions as a stopper for stopping the moving object 4 without permitting the moving object 4 to come into contact with the rod cover 3 after the moving object 4 collides with the leading end of the rod 7. The bearing 12, which is made of a synthetic resin having the shock-absorbing property, does not generate dust particles even when the moving object 4 collides therewith and can stop the moving object 4 at a predetermined stop location in a shock-absorbing manner. A material having the sliding property and the dust-resistant property is suited for the bearing 12, and one example of that material may be a polyphenylene sulfide (PPS).

To stably guide the rod 7, a length S of the bearing 12 in the direction of the axis L may preferably be equivalent to or larger than the diameter of the rod 7.

The housing body 2 has an inlet 14 for use in charging the oily liquid into the piston chamber 5. The inlet 14 is in a head-side end portion opposite the side on which the rod cover 3 is mounted. The inlet 14 is closed by threading a plug 15 therein. The plug 15 also serves as a pressure regulating member for providing the oily liquid with pre-compression. The plug 15 is mounted on the inlet 14 by threaded engagement between its external screw portion and an internal screw portion of the inlet 14. By moving the plug 15 forward and depressing a seal member 15a along a cylindrical portion 14a in the inlet 14, the oily liquid in the cylinder housing 1 is pressurized. By doing this, the oily liquid of the amount corresponding to leakage can be press-fitted to the piston chamber 5 in advance.

A holder 18 for forming an accumulator described below is held on the rod-side end portion on which the rod cover 3 is mounted on the housing body 2. The holder 18 is provided with an O ring 19 on the outer circumferential surface on the rod-side end portion in internal space in the cylinder housing 1. The holder 18 has a cut portion 21 for housing a rod gasket 20 being in slidable contact with the outer circumferential surface of the rod 7 and sealing that circumferential surface.

A dust collecting member 24 for preventing entry of dust and a lubricating member 25 for retaining a lubricating oil and supplying it to the outer circumferential surface of the rod 7 are located inside with respect to the bearing housing hole 10a in the cylinder housing 1, that is, located on the side of the piston chamber 5, inside the rod guiding hole 10 in the rod cover 3 in the cylinder housing 1. In the case where the housing body 2 and rod cover 3 are integrated, the dust collecting member 24 and lubricating member 25 may be located on the side of the piston chamber 5 with respect to the bearing housing hole 10a in the rod guiding hole 10.

The piston 6 is housed movably in the direction of the axis L inside the piston chamber 5 such that a gap for providing the oily liquid with flow resistance is maintained between the outer circumferential surface of the piston 6 and the inner circumferential surface of the piston chamber 5.

The piston 6 is mounted on a reduced diameter portion 7a, which has a reduced diameter, at the base end portion of the rod 7. A one-way channel is disposed between the rod 7 and piston 6. When the piston 6 is depressed toward a compression side chamber 5a, as illustrated in FIG. 2, the one-way channel blocks passage of the oily liquid flowing from the compression side chamber 5a toward an open side chamber 5b. When the piston 6 returns toward the open side chamber 5b, as illustrated in FIG. 1, the one-way channel permits passage of the oily liquid flowing from the open side chamber 5b toward the compression side chamber 5a. The one-way channel is formed as described below.

That is, a continuous open gap 22a allowing the front side and rear side of the piston 6 to continuously communicate with each other is disposed between the outer circumferential surface of the reduced diameter portion 7a in the rod 7 and the inner circumferential surface of a center hole 6a in the piston 6. Each of a step portion 7b on an end side of the reduced diameter portion 7a in the rod 7 and a side surface 6b facing the step portion 7b in the piston 6 is formed as a flat surface. The flat surfaces can come into contact with or be separated from each other by slight movement of the piston 6 in the direction of the axis L, and this allows an open/close gap 22b to be formed between the step portion 7b and side surface 6b. As illustrated in FIG. 2, when the step portion 7b comes into contact with the piston 6, the open/close gap 22b is closed and the passage of the oily liquid is prevented. As illustrated in FIG. 1, when the step portion 7b is separated from the piston 6, the open/close gap 22b is opened and the passage of the oily liquid is allowed. In this way, the one-way channel is formed between the continuous open gap 22a and open/close gap 22b.

An annular spring receiver 27 is mounted at a location nearer the base end portion than the piston 6 in the rod 7 by using a stop collar. The return spring 8 for urging the piston 6 toward the open side chamber 5b is disposed between the spring receiver 27 and the head side end in the piston chamber 5. The return spring 8 continuously urges the piston 6 and rod 7 in a direction in which they returns to the initial position illustrated in FIG. 1. The length of the reduced diameter portion 7a in the rod 7 in the axial direction is slightly larger than the thickness of the piston 6. A length that allows the piston 6 to be able to freely move on the reduced diameter portion 7a in the rod 7 in the axial direction is determined by the mounting location of the spring receiver 27 on the leading end of the rod 7. In this way, the oily liquid flowing there can maintain its smooth stream suited for the returning operation of the piston 6.

The holder 18 for forming the accumulator is provided with a cylindrical sleeve 29 surrounding the perimeter of the rod 7. An accumulating chamber 30 is defined around the sleeve 29. An elastic member 31 made of a closed cell foam is housed inside the accumulating chamber 30. In this way, the accumulator is configured. The axial length of the elastic member 31 in a non-compressed state is substantially the same as the length of the accumulating chamber 30 in the direction of the axis L. In the initial state illustrated in FIG. 1, the elastic member 31 is in an elastically compressed state because of pressure of the oily liquid press-fitted through the inlet 14 in the piston chamber 5. The inside of the accumulating chamber 30 communicates with the piston chamber 5 through a communication path. Thus the oily liquid disposed in the piston chamber 5 is also in a state pressurized by resilience of the compressed elastic member 31.

In the case where the piston 6 and rod 7 move from the initial position illustrated in FIG. 1 toward the damping position illustrated in FIG. 2, the oily liquid in the compression side chamber 5a moves to the open side chamber 5b. With the movement of the piston 6 and rod 7, the rod 7 enters the open side chamber 5b, and thus it is necessary to prepare a space for holing the oily liquid of the volume of that introduced rod 7 in the cylinder housing 1. This space is generated by deformation by compression of the elastic member 31 housed in the accumulating chamber 30. In contrast, in the case where the piston 6 returns from the damping position to the initial position, the oily liquid in the open side chamber 5b returns to the compression side chamber 5a. This oily liquid is the one obtained by being moved back by expansion by returning of the previously compressed elastic member 31 press fitted in the accumulating chamber 30.

As previously described, the dust collecting member 24 for preventing entry of dust particles is arranged on the side of the bearing housing hole 10a in the rod guiding hole 10. The dust collecting member 24 is made of a porous material, maintained in a dry state, has the property of absorbing dust particles, and functions to prevent the dust particles adhering to the rod 7 from entering the rod gasket 20. The porous material forming the dust collecting member 24 may preferably have the property of absorbing liquid to have the function of gathering and holding an oil film that adheres to the rod 7 and may leak to the outside.

The lubricating member 25 for holding the lubricating oil is arranged in a location nearer the piston chamber 5 than the dust collecting member 24. The lubricating member 25 is made of a porous material and functions to suck a lubricant and supply the lubricant to the surface of the rod.

The porous material forming each of the dust collecting member 24 and lubricating member 25 may preferably be formed from a felt member or the like.

With the above-described configuration, the lubricant, such as grease, sucked in the lubricating member 25 is continually supplied to the surface of the rod 7, and an oil film is formed. Thus the rod 7 can smoothly slide. Because the dust collecting member 24, which is made of a porous material that absorbs dust particles in a dry state, is disposed on the side of the bearing housing hole 10a in the rod guiding hole 10, the dust collecting member 24 can capture dust particles adhering to the rod 7 and prevent it from entering the inside and also can gather an oil film that adheres to the rod 7 and may leak to the outside and can avoid contamination of an outside environment caused by leakage of the oil film as much as possible. At the same time, wastage of the oil film can be significantly reduced.

If the lubricant, such as grease, sucked in the lubricating member 25 is continually supplied to the surface of the rod, the remaining is reduced, and the supply of the lubricant is virtually impossible, the oily liquid charged in the piston chamber 5 may be used in forming the oil film as an alternative to the lubricant. In this case, substantially the same function as that when the lubricant is used can be maintained.

The rod gasket 20 for sealing between the outer circumferential surface of the rod 7 and the inner circumferential surface of the sleeve 29 is arranged on the end in the rod guiding hole 10, where the dust collecting member 24 and lubricating member 25 are disposed, on the side of the piston chamber 5. The relationship between the location where the rod gasket 20 is arranged and an operation stroke of the rod 7 is set such that a portion of the outer circumferential surface of the rod 7 that comes into contact with the rod gasket 20 when the rod 7 is fully depressed in the bearing 12, as illustrated in FIG. 2, is not exposed to the outside from the bearing 12 when the rod 7 retracts and protrudes from the bearing 12, as illustrated in FIG. 1. This configuration is also effective in suppressing entry of dust particles adhering to the rod 7 into the cylinder housing 1 and is also effective in suppressing adhesion of the oil film to the rod and leakage of the oil film to the outside.

Generally, in the shock absorber, the moving object 4 may not collide with the leading end of the rod 7 along the direction of the axis L of the rod 7. For example, it may collide with a slight angular deviation with respect to the direction of the axis L. In such a case, as described above, when the dust collecting member 24 and lubricating member 25 are arranged on the rod guiding hole 10 in the cylinder housing 1, because the rod 7 needs to have a length corresponding to them, it is estimated that the effects of an impact force from the moving object 4 that has collide with the angular deviation on the rod 7 and bearing 12 is larger accordingly. However, in such a case where the moving object 4 collides with the rod in a direction inclined to the axial direction, the existence of the bearing 12, which is made of a synthetic resin and tightly fit in the bearing housing hole 10a in the rod guiding hole 10, reduces the effects of the force to the inclined direction on the rod. This can reduce the load on the rod, stabilize its sliding, and stabilize the operations of the dust collecting member and lubricating member, and as a result, can reduce entry of wear particles or the like into the rod gasket and can also reduce its wearing.

According to the low-dust/dust-resistant shock absorber 50A described above, generation of dust particles in collision between the moving object 4 and the rod or cylinder housing can be suppressed. Additionally, entry of foreign substances or the like can be suppressed, and leakage of the oil film for lubrication to the outside over the bearing can also be suppressed. Thus this shock absorber can be used even under environments that dislike metal dust particles and can maintain an extended life even under environments with a larger amount of dust particles.

Figure 3:
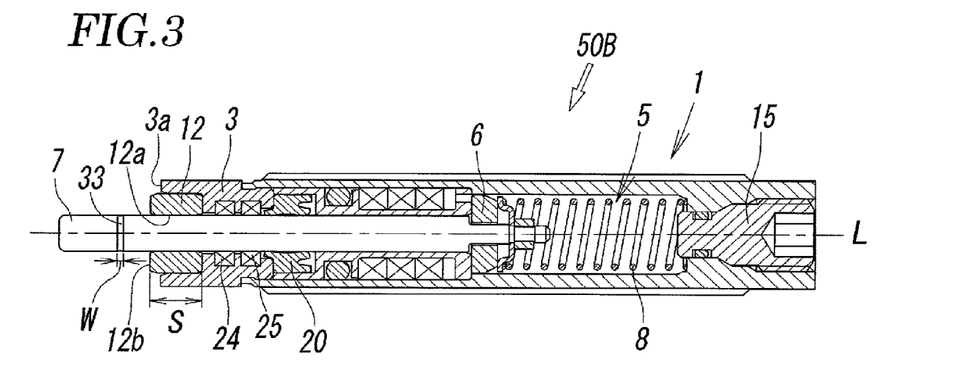
FIG. 3 is a cross-sectional view that illustrates a shock absorber according to a second embodiment of the present invention in a state where a piston and rod are in an initial position.
Figure 4:
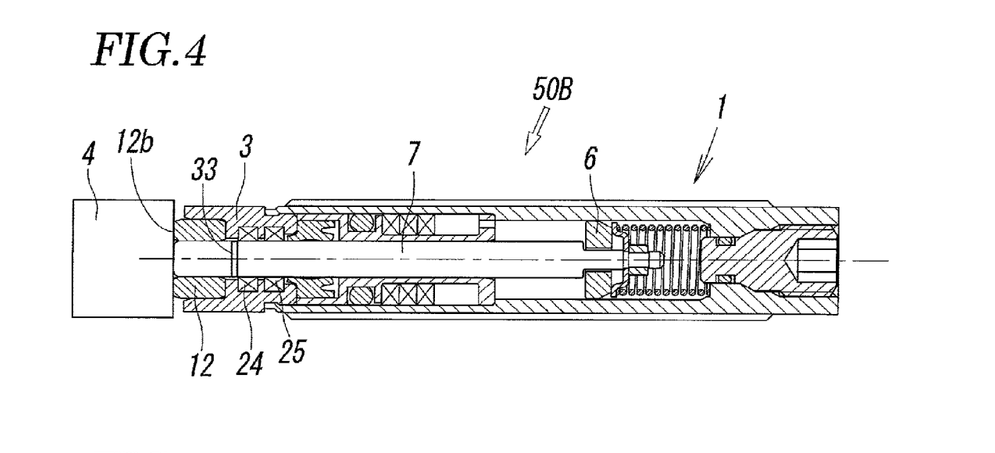
FIG. 4 is a cross-sectional view that illustrates an operating state where the piston and rod in the shock absorber according to the second embodiment are moved to a damping position.

FIGS. 3 and 4 illustrate a shock absorber according to a second embodiment of the present invention. A shock absorber 50B according to the second embodiment differs from the shock absorber 50A according to the first embodiment in that a groove 33 for reducing the area of the rod 7 coming into contact with the inner circumferential surface of the center hole 12*a* in the bearing 12. The other configuration is substantially the same as that in the shock absorber 50A according to the first embodiment. The same reference numerals are used as in the shock absorber 50A for the main identical portions, the description thereof is omitted, and the configuration relating to the groove 33 is described below.

In generally, under a work environment where a shock absorber is used, when the grain size of dust particles is reduced to several micrometers, because the particles of the dust are placed under the control of static electricity from under the control of the gravity, the particles adhering to the surface of the rod 7 are not easily removable by the dust collecting member 24. Thus, the particles adhering to the surface of the rod 7 easily adhere to and deposit on the inner circumferential surface of the center hole 12*a* in the bearing 12, which is made of a synthetic resin.

To solve such a problem, the shock absorber 50B according to the second embodiment has the groove 33 in the outer surface of the rod 7 to reduce the area of the rod 7 coming into contact with the bearing 12 and reduces the amount of dust particles brought into the bearing 12.

Figure 5:
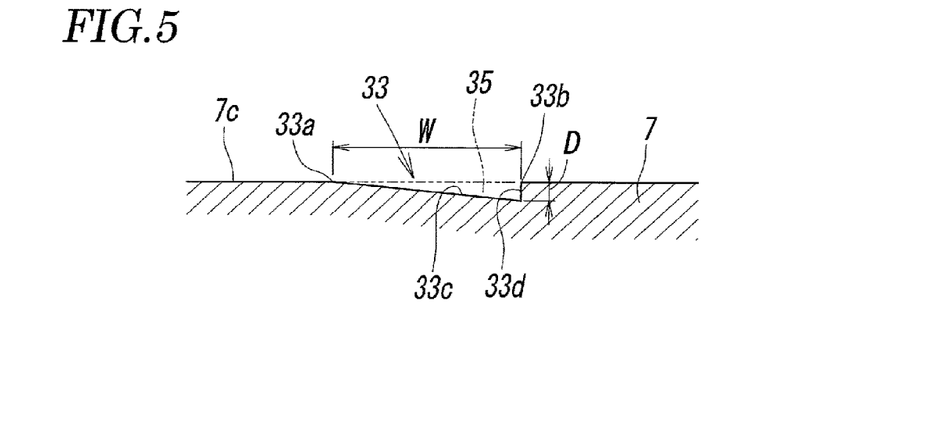
FIG. 5 is a partially enlarged cross-sectional view of a groove in the rod.

The groove 33 is a circular groove surrounding the perimeter of the rod 7. The groove 33 has a groove width W that is smaller than a length S of the bearing 12 and constant throughout the entire perimeter of the groove 33. The depth of the groove 33 is not constant in the direction of the width W of the groove 33 such that, as illustrated in FIG. 5, it is gradually deeper toward the base end side of the rod 7 (right in FIG. 5). That is, the groove 33 has a cross-sectional shape defined by two sides of a triangle and includes a bottom wall 33*c* and a side wall 33*d*. The bottom wall 33*c* is inclined in a direction in which the depth of the groove increases from a first groove end 33*a* at the leading end of the rod toward a second groove end 33*b* at the base end of the rod. The side wall 33*d* is disposed on the second groove end 33*b*. The end portion of the bottom wall 33*c* on the side of the first groove end 33*a* is in the same location as an outer circumferential surface 7*c* in the rod 7. The end portion of the bottom wall 33*c* on the side of the second groove end 33*b* is continuous with the lower end of the side wall 33*d*, that is, an internal diameter end.

A preferred value of the depth D of the groove in the deepest portion on the side of the second groove end 33*b* varies depending on the diameter of the rod 7. Typically, it may preferably be approximately 0.5% to 20% of the diameter of the rod 7, and more preferably, it may be approximately 0.5% to 5% thereof.

The side wall 33*d* may not be perpendicular to the axis L. For example, it may be angled such that it gradually approaches the base end side of the rod 7 as it becomes nearer the external diameter side.

The location of the groove 33 in the rod 7 is set such that in the case where the rod 7 is in the initial position illustrated in FIG. 3, that is, in the case where the rod 7 protrudes from the bearing 12 at maximum, the groove 33 is exposed to the outside of the bearing 12 and when the rod 7 is depressed into the bearing 12 by the moving object, the groove 33 can come into contact with the inner circumferential surface of the center hole 12*a* in the bearing 12.

Figure 6:
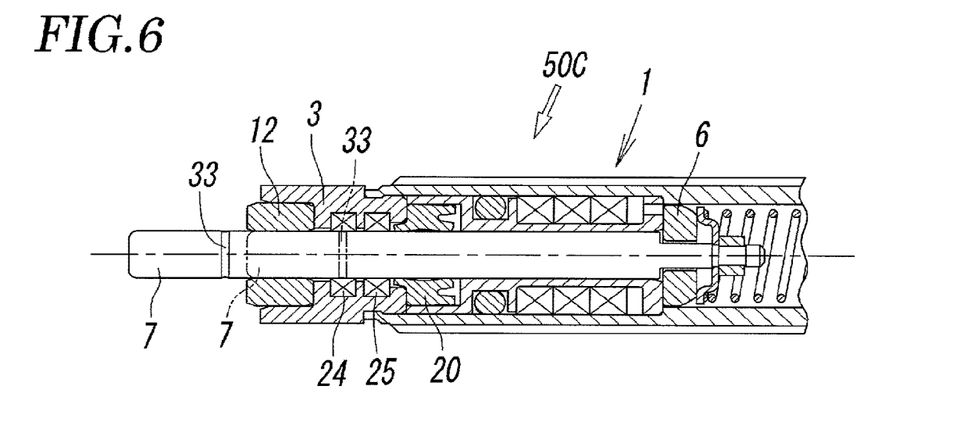
FIG. 6 is a cross-sectional view that illustrates a main portion of a shock absorber according to a third embodiment of the present invention.

In this case, the groove 33 may preferably be arranged such that, when the groove 33 is depressed into the bearing 12 by the moving object 4 at maximum and reaches the damping position, the groove 33 moves past the bearing 12 and stops before the dust collecting member 24, as illustrated in FIG. 4, or as in a shock absorber SOC according to a third embodiment illustrated in FIG. 6, the groove 33 is in a location overlapping the dust collecting member 24, that is, a location at which it remains inside the dust collecting member 24. The groove 33 may also be in a location at which it remains inside the bearing 12. In other words, the groove 33 may preferably be in a location at which even when the rod 7 is depressed up to the damping position, the groove 33 does not come into contact with the lubricating member 25. This can prevent the lubricating oil sucked in the lubricating member 25 from moving out through the groove 33.

Figure 7:
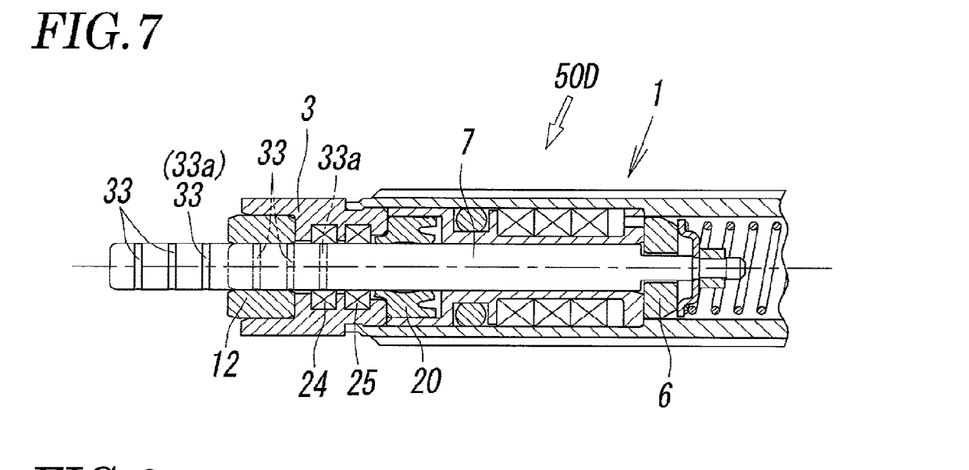
FIG. 7 is a cross-sectional view that illustrates a main portion of a shock absorber according to a forth embodiment of the present invention.

As in a shock absorber 50D according to a fourth embodiment illustrated in FIG. 7, the rod 7 can have a plurality of grooves 33. In this case, the plurality of grooves 33 may be spaced uniformly or at irregular intervals. The plurality of grooves 33 may preferably be arranged such that, as indicated by the chain line illustrated in FIG. 7, when the rod 7 is depressed up to the damping position, the groove 33*a* nearest the base end of the rod 7 is in a location before the dust collecting member 24 or a location overlapping the dust collecting member 24 and the other grooves 33 move pass the bearing 12 or remain inside the bearing 12.

In this way, as in the shock absorbers 50B to 50D according to the second to fourth embodiments, in which one or more grooves 33 are disposed in the perimeter of the rod 7, the area of the rod 7 coming into contact with the bearing 12 when the rod 7 is depressed into the bearing 12 is reduced by the amount corresponding to the width of the groove 33 or the total width of the grooves 33. Accordingly, the quantity of the dust particles adhering to the outer circumferential surface of the rod 7 and being brought into the bearing 12 is smaller than that in the case where the rod 7 has no groove 33, and the decrease in the sliding property of the rod 7 caused by the adhesion of the dust particles to the inner circumferential surface of the bearing 12 is reduced.

Because when the rod 7 depressed into the bearing 12 returns to the initial position, the dust particles adhering to the inner circumferential surface of the bearing 12 are scraped off by an edge of the groove 33, in particular, edge on the side of the second groove end 33*b* and ejected to the outside, the advantage of achieving the dust removing effect for the bearing 12 is also obtainable.

As illustrated in FIG. 5, a felt dust-particle capturing member 35 may be disposed inside the groove 33. With this configuration, the dust particles adhering to the inner circumferential surface of the bearing 12 can be captured by being scraped off by the dust-particle capturing member 35 and can be effectively ejected to the outside.

Figure 8:
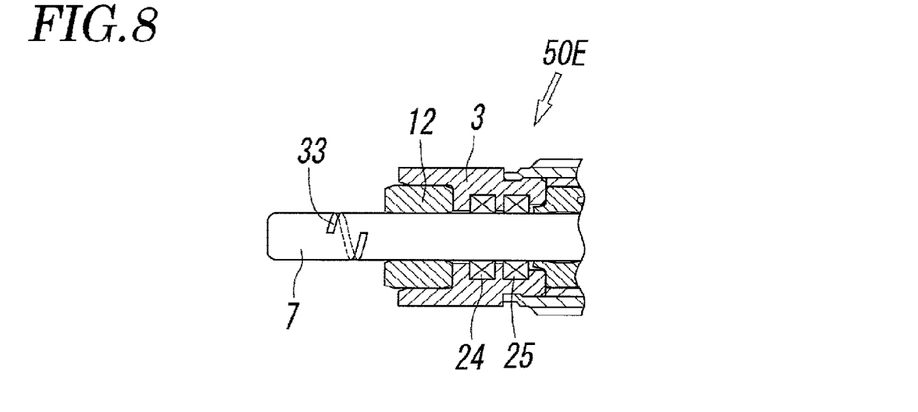
FIG. 8 is a cross-sectional view that illustrates a main portion of a shock absorber according to a fifth embodiment of the present invention.

The groove(s) 33 in the second to fourth embodiments is circular, but it may have a spiral shape, as in a shock absorber 50E according to a fifth embodiment illustrated in FIG. 8. In the case where the spiral groove 33 is disposed, the groove 33 may preferably have a length at which it is wound around the rod 7 one or more times.

The groove 33 may have a depth constant in the direction of the width W. The groove 33 may have a U-shaped cross section.

Furthermore, instead of the circular or spiral groove 33 extending around the perimeter of the rod 7, a linear groove extending in parallel with the axis L, a curved groove that constitutes a part of a spiral, or the like may be disposed on the outer surface of the rod 7. In such cases, a plurality of grooves may preferably be spaced uniformly around the axis L.

REFERENCE SIGNS LIST 1 cylinder housing
2 housing body
3 rod cover
4 moving object
5 piston chamber
6 piston
7 rod
8 return spring
10 rod guiding hole
12 bearing
12a center hole
12b contact portion
20 rod gasket
24 dust collecting member
25 elastic member
33, 33a groove
50A, 50B, 50C, 50D, 50E shock absorber
L axis
S length
W groove width

The invention claimed is:

1. A low-dust/dust-resistant shock absorber comprising:
a metal cylinder housing including a piston chamber in which oily liquid is sealed;
a piston movable in an axial direction in the piston chamber in a state where a gap for providing the oily liquid with flow resistance is maintained;
a rod including a base end portion connected to the piston and a leading end portion protruding out through a rod guiding hole in the cylinder housing in a fluid-tight manner, the rod allowing a moving object to be subjected to braking to collide with the leading end portion; and
a return mechanism that urges the rod in a direction in which the rod protrudes from the cylinder housing,
wherein a cylindrical bearing made of a synthetic resin having a shock-absorbing property is mounted on an end portion of the rod guiding hole in the cylinder housing, the rod comes into contact with, and extends through, a center hole of the bearing so as to be able to freely slide, a leading end of the bearing protrudes outside with respect to an outer end surface of the cylinder housing and acts as a contact portion that allows the moving object to come into contact therewith, whereby the bearing also functions as a guide for guiding the rod and as a stopper for preventing the moving object from coming into contact with the outer end surface of the cylinder housing, and
a dust collecting member for preventing entry of dust particles, and a lubricating member for retaining a lubricating oil and supplying the lubricating oil to a surface of the rod, are disposed at a location in the rod guiding hole on a side of the piston chamber with respect to the bearing.

2. The shock absorber according to claim 1, wherein the bearing has an axial length equivalent or larger than a diameter of the rod.

3. The shock absorber according to claim 1, wherein the cylinder housing includes a housing body including the piston chamber and a rod cover connected to an end portion of the housing body, and the dust collecting member and the lubricating member are disposed on the rod cover.

4. The shock absorber according to claim 1, wherein each of the dust collecting member and the lubricating member is made of a porous material, and the dust collecting member is held in a dry state.

5. The shock absorber according to claim 1, wherein a rod gasket is arranged in a location of an end in the rod guiding hole on the side of the piston chamber, the rod gasket is in slidable contact with an outer circumferential surface of the rod, and a relationship between the location of the rod gasket and a stroke of the rod is set such that a portion in the rod that comes into contact with the rod gasket when the rod is fully depressed into the bearing is not exposed to an outside from the bearing when the rod protrudes.

6. A low-dust/dust-resistant shock absorber comprising:
a metal cylinder housing including a piston chamber in which oily liquid is sealed;
a piston movable in an axial direction in the piston chamber in a state where a gap for providing the oily liquid with flow resistance is maintained;
a rod including a base end portion connected to the piston and a leading end portion protruding out through a rod guiding hole in the cylinder housing in a fluid-tight manner the rod allowing a moving object to be subjected to braking to collide with the leading end portion; and
a return mechanism that urges the rod in a direction in which the rod protrudes from the cylinder housing,
wherein a cylindrical bearing made of a synthetic resin having a shock-absorbing property is mounted on an end portion of the rod guiding hole in the cylinder housing, the rod comes into contact with, and extends through, a center hole of the bearing so as to be able to freely slide, a leading end of the bearing protrudes outside with respect to an outer end surface of the cylinder housing and acts as a contact portion that allows the moving object to come into contact therewith, whereby the bearing also functions as a guide for guiding the rod and as a stopper for preventing the moving object from coining into contact with the outer end surface of the cylinder housing, and
a dust collecting member for preventing entry of dust particles, and a lubricating member for retaining a lubricating oil and supplying the lubricating oil to a surface of the rod, are disposed at a location in the rod guiding hole on a side of the piston chamber with respect to the bearing,
wherein the rod has a groove for reducing an area of the rod that comes into contact with the bearing, and the groove is disposed in an outer surface of the rod.

7. The shock absorber according to claim 6, wherein the groove is in a location at which, when the rod is in an initial position, the groove is exposed from the bearing and, when the rod is depressed into the bearing by the moving object, the groove comes into contact with an inner circumferential surface of the bearing.

8. The shock absorber according to claim 6, wherein the groove has a depth gradually deeper toward a base end of the rod.

9. The shock absorber according to claim 6, wherein the groove has a circular or spiral shape.

10. The shock absorber according to claim 6, wherein a dust-particle capturing member for capturing dust particles adhering to an inner circumferential surface of the bearing is disposed inside the groove.

* * * * *